Dec. 30, 1947.  S. DU PONT  2,433,686
SADDLE FOR MOTORCYCLES AND THE LIKE
Filed Aug. 28, 1944  2 Sheets-Sheet 1

INVENTOR
STEPHEN DU PONT
BY Chapin & Neal
ATTORNEYS

Dec. 30, 1947.  S. DU PONT  2,433,686

SADDLE FOR MOTORCYCLES AND THE LIKE

Filed Aug. 28, 1944  2 Sheets-Sheet 2

INVENTOR
STEPHEN DU PONT
BY Chapin & Neal
ATTORNEYS

Patented Dec. 30, 1947

2,433,686

UNITED STATES PATENT OFFICE 2,433,686

SADDLE FOR MOTORCYCLES AND THE LIKE

Stephen du Pont, Wilbraham, Mass., assignor to Ind'an Motocycle Company, Springfield, Mass., a corporation of Massachusetts Application August 28, 1944, Serial No. 551,472

2 Claims. (Cl. 155—5.23)

This invention relates to a saddle for motorcycles and the like which is adapted for attachment directly to a rigid part of the motorcycle frame.

An essential feature of the invention is the provision of a deep block of sponge rubber or the like having sufficient body and thickness to comfortably support a rider without the aid of springs or other movable metal parts and in so mounting said block as to restrain undue side sway thereof when riding.

The advantages of the invention reside in its simplicity of construction, economy of manufacture, absence of moving metal parts subject to wear and squeak and the fact that it provides the utmost comfort attainable in a seat of this character.

Further objects and advantages will become apparent from the following detailed specification taken in connection with the accompanying drawings in which.

Figure 1:
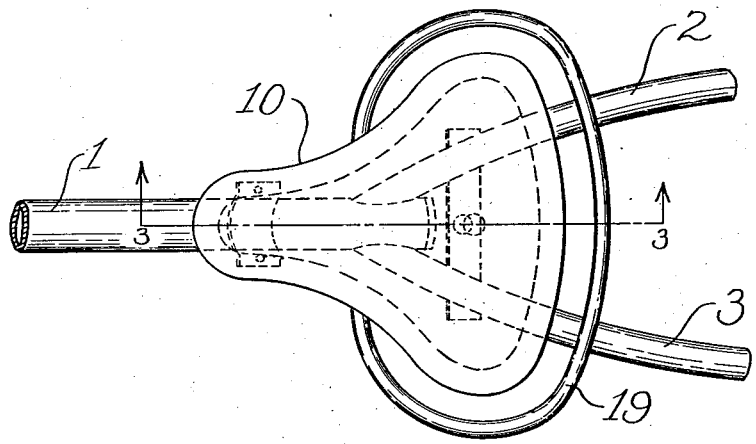
Fig. 1 is a top view of the saddle shown as mounted on the motorcycle frame.
Figure 2:
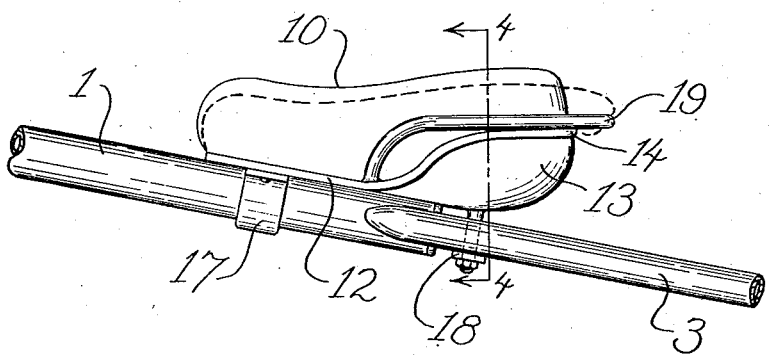
Fig. 2 is a side view thereof.

Referring more particularly to Figs. 1 and 2 a portion of the frame of the motorcycle is shown with its upper bar at 1 and branching rear fork bars 2 and 3.

The saddle comprises as its main body a relatively deep block of homogeneous soft resilient material like vulcanized sponge rubber indicated generally on the drawings at 5. This rubber block is of sufficient thickness and resiliency to provide the utmost in riding comfort without the necessity of using any springs or other resilient supports for the saddle. The block of sponge rubber 5 may be suitably formed by a molding operation into its functional shape as a saddle having the usual pommel 6, seat 7 and cantle portion 8. It may be appropriately formed with air cells as indicated at 9 which cells vary in size or number in accordance with the weight of the load which the saddle is to carry. The bottom of the block is substantially flat while the seat portion is slightly depressed between pommel and cantle as shown.

A rubber-like envelope 10 is employed for covering the block 5 as a protection therefor and said envelope 10 is closely fitted around the side and the top of the block 5 and may be secured thereto either by cement or by being molded integrally with the sponge rubber block portion when originally formed. At the bottom of the block 5 and preferably cemented thereto, there is provided a stiff bottom plate 11 which may be of metal, wood, or fiberboard. This bottom plate is suitably perforated as shown to provide breathing vents for the air cells 5 in the rubber block.

The saddle comprising the assembled block 5, envelope 10 and bottom plate 11, is received and securely held within a pocket base member 12 which in turn is fastened directly to the frame of the motorcycle. The base member is designed to hold the rubber block against side sway when loaded with a rider and yet under no conditions interfere with the comfort of the rider by presenting any hard or rigid surfaces to pound against. This pocket base member 12 is formed of a rigid metal plate having an integral upturn side wall 13 for embracing the rear portion of the block 5 as shown in Fig. 2. The side wall 13 extends upwardly and terminates in a beaded rim 14 well below the top of the block 5 and thus serves to prevent side sway of the saddle during the riding. When the saddle is loaded and compressed by the rider thereon the upper portion of the resilient rubber block 5 will bulge outwardly over the rim 14 of the side wall as shown in dotted lines in Fig. 2, but at no time does this rim 14 project beyond the compressed seat of the saddle so as to be felt by the rider. Under all conditions the rider is seated on a soft and resilient cushion without striking bottom so to speak.

The block of rubber 5, its envelope 10 and baseboard 11 are preferably fastened to the base plate 12 by suitable screws indicated at 15 and 16 so as to be securely and rigidly attached thereto at all times. The base mount or plate 12 is in turn fastened to the frame of the motorcycle by suitable clamp-brackets and bolts indicated at 17 the forward end, and 18 at the rear end.

Figure 3:
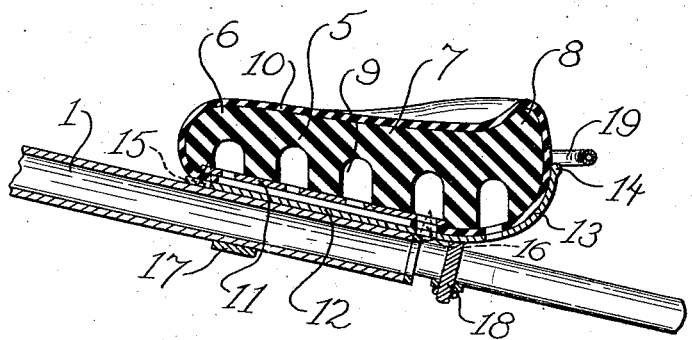
Fig. 3 is a longitudinal vertical section view of the saddle along 3—3 of Fig. 1.
Figure 4:
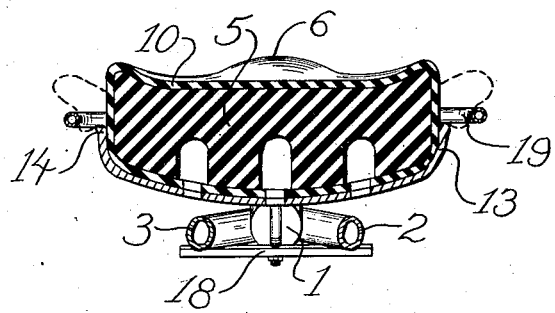
Fig. 4 is a transverse sectional view along the line 4—4 of Fig. 2.

In some cases it may be desirable to provide a hand rail at the rear of the saddle which may be grasped by the rider in manipulating the motorcycle when dismounted. Such a bar is provided by U-shaped metal rod or tube 19 which is fastened at its forward ends to the base plate 12 and extended around in laterally spaced relation to the rim of the side wall 13. When this handle bar is thus added to the base plate it will serve to further limit the outward bulge of the compressed block 5 when loaded as shown in dotted lines Figs. 2 and 3.

I claim:

1. A saddle for motorcycle frames and the like comprising as its main body a relatively deep block of homogeneous soft resilient material like sponge rubber molded into the functional shape of a saddle, a pocket base member of rigid metal for receiving said block mounted upon said motorcycle frame having a rigid side wall embracing said block and extending upwardly to a rim substantially below the top of said block for restricting side sway of said block when under load in riding, said block having its upper portion bulging over the rim of said side wall when compressed under load, and a rigid hand rail mounted on said base member in laterally spaced relation to the rim of said side wall in position to support the bulged over portion of said block when compressed under load.

2. A saddle for motorcycle frames and the like comprising as its main body a relatively deep block of homogeneous soft resilient material like sponge rubber molded into the functional shape of a saddle, a stiff bottom plate cemented to the underside of said block, a rubber-like envelope closely fitted around the top and sides of said block and secured to said bottom plate, a pocket base member of rigid metal mounted upon the frame of said motorcycle having a rigid side wall embracing said block and extending upwardly to a rim substantially below the top of said block for restricting side sway of said block when under load in riding, said block having its upper portion bulging over the top rim of said side wall when compressed under load, and a rigid hand rail fastened to said base member and extending in laterally spaced relation to the rim of said side wall in position to support the bulged over portion of said block when compressed under load.

STEPHEN DU PONT.

REFERENCES CITED

The following references are of record in the file of this patent:

UNITED STATES PATENTS

| Number | Name | Date |
|--------|------|------|
| 562,965 | Lester | June 30, 1896 |
| 1,525,869 | Lakeman | Feb. 10, 1925 |
| 2,244,956 | Miller et al. | June 10, 1941 |
| 588,288 | Petett | Aug. 17, 1897 |
| 2,367,628 | Teague | Jan. 16, 1945 |

FOREIGN PATENTS

| Number | Country | Date |
|--------|---------|------|
| 24,362 | Great Britain | Dec. 19, 1895 |
| 482,502 | Great Britain | Mar. 30, 1938 |